(12) United States Patent
Erdmann et al.

(10) Patent No.: US 8,413,431 B2
(45) Date of Patent: Apr. 9, 2013

(54) TANK ASSEMBLY

(75) Inventors: Matthew L. Erdmann, Ypsilanti, MI (US); Gregory W. Massa, Birmingham, MI (US); Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 336 days.

(21) Appl. No.: 12/791,947

(22) Filed: Jun. 2, 2010

(65) Prior Publication Data

US 2011/0005210 A1  Jan. 13, 2011

Related U.S. Application Data

(60) Provisional application No. 61/221,766, filed on Jun. 30, 2009.

(51) Int. Cl.
*F01N 3/20* (2006.01)
(52) U.S. Cl. ............... 60/295; 60/286; 60/301; 60/303
(58) Field of Classification Search ............ 60/286, 60/295, 301, 303
See application file for complete search history.

(56) References Cited

U.S. PATENT DOCUMENTS

| 5,579,742 | A | | 12/1996 | Yamazaki et al. | |
| 5,758,496 | A | * | 6/1998 | Rao et al. | 60/295 |
| 6,155,316 | A | * | 12/2000 | Benjey | 141/348 |
| 2004/0011401 | A1 | | 1/2004 | Kato | |
| 2004/0050418 | A1 | | 3/2004 | Yoshihara et al. | |
| 2006/0011173 | A1 | * | 1/2006 | Davis et al. | 123/520 |
| 2006/0180241 | A1 | * | 8/2006 | McClung | 141/285 |
| 2007/0084193 | A1 | * | 4/2007 | Levin | 60/283 |
| 2007/0163673 | A1 | | 7/2007 | Kallberg | |
| 2008/0276598 | A1 | * | 11/2008 | Gresens | 60/286 |

FOREIGN PATENT DOCUMENTS

EP  0845624 A2  6/1998

* cited by examiner

*Primary Examiner* — Thomas Denion
*Assistant Examiner* — Jorge Leon, Jr.
(74) *Attorney, Agent, or Firm* — Quinn Law Group, PLLC

(57) ABSTRACT

A tank assembly (70) for storing a liquid reductant (74) includes a tank (78) defining a chamber (82), a filler tube (94) having an opening (102) and at least partially defining a fill passageway (98) from the opening (102) to the chamber (82), and a vent system (130). The vent system (130) includes a recirculation line (150) that provides fluid communication between the chamber (82) and the fill passageway (98). A float valve (174) in the recirculation line (150) prevents the conveyance of liquid (74) through the recirculation line (150).

18 Claims, 7 Drawing Sheets

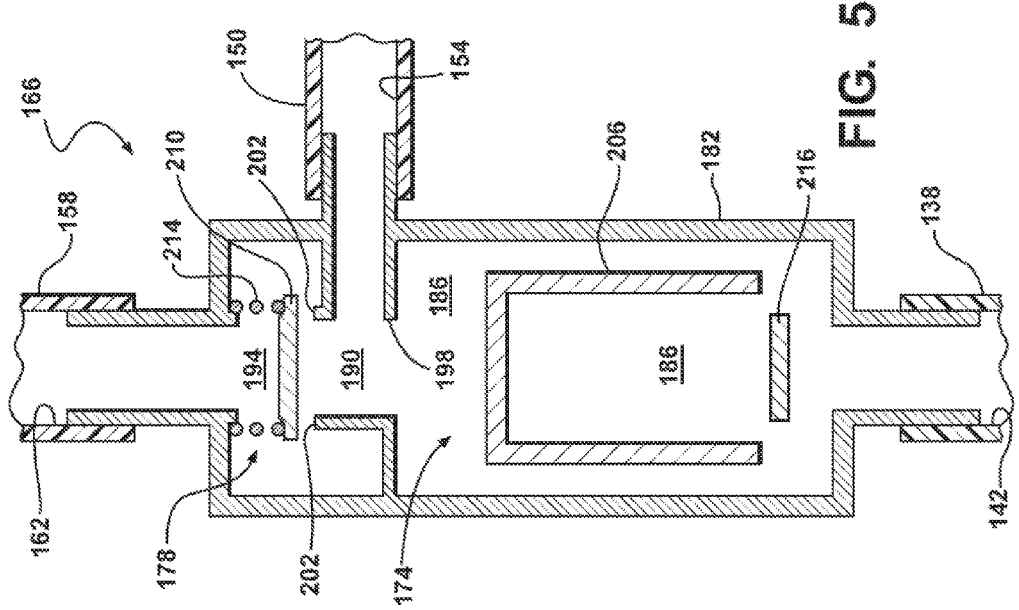
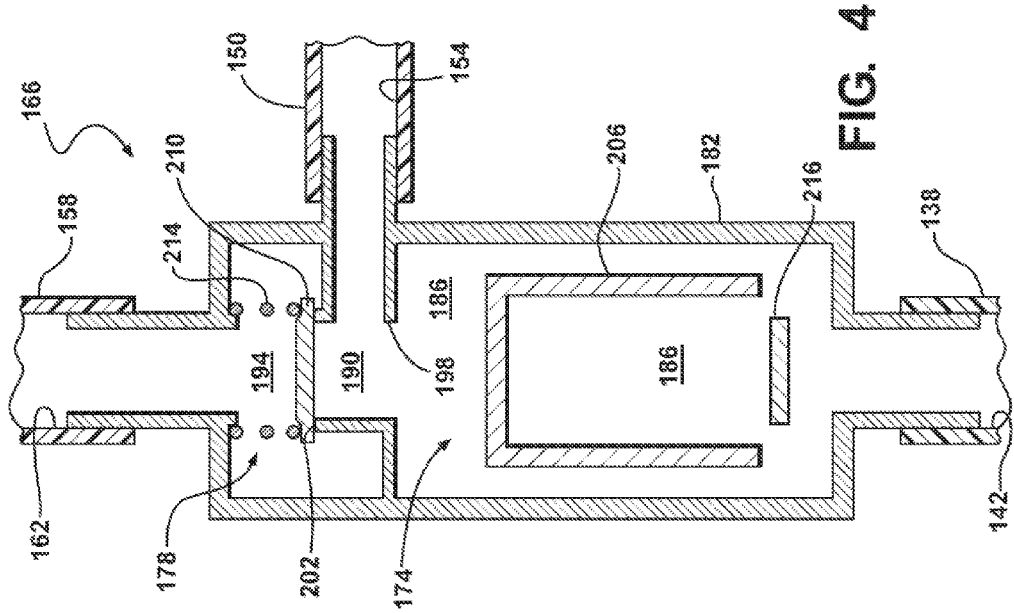

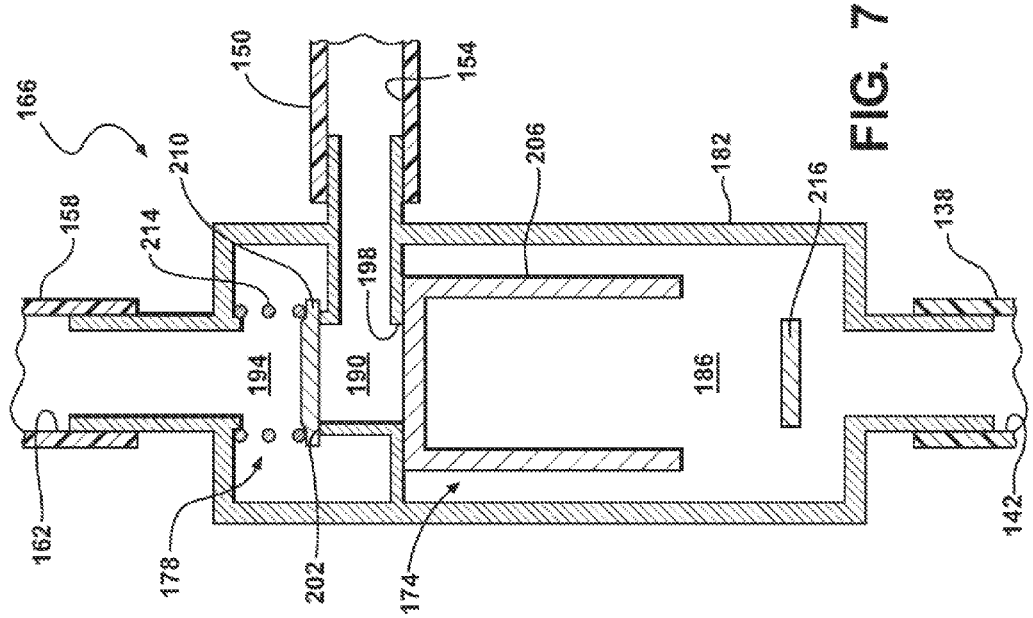
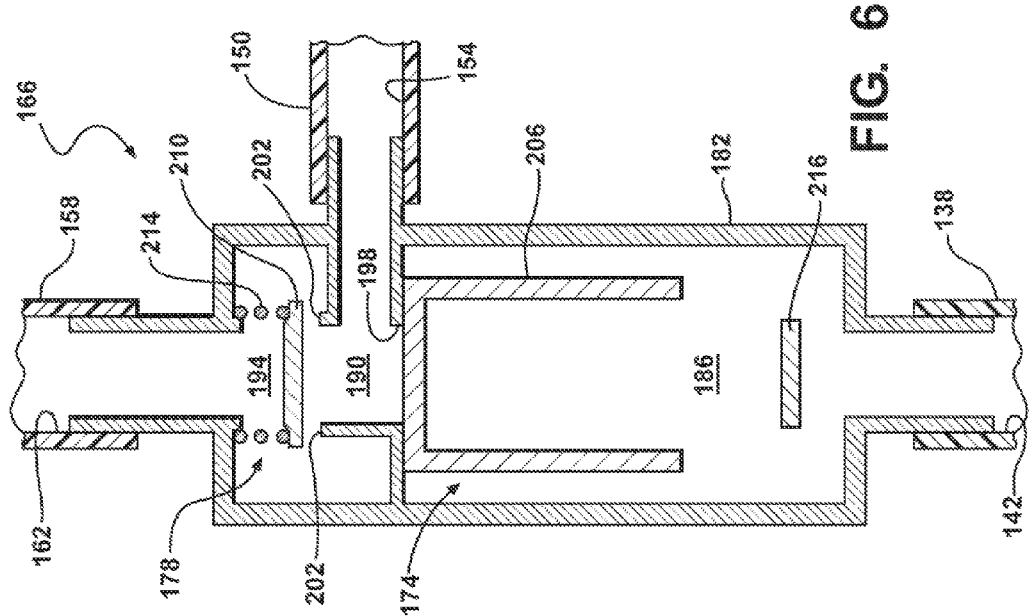

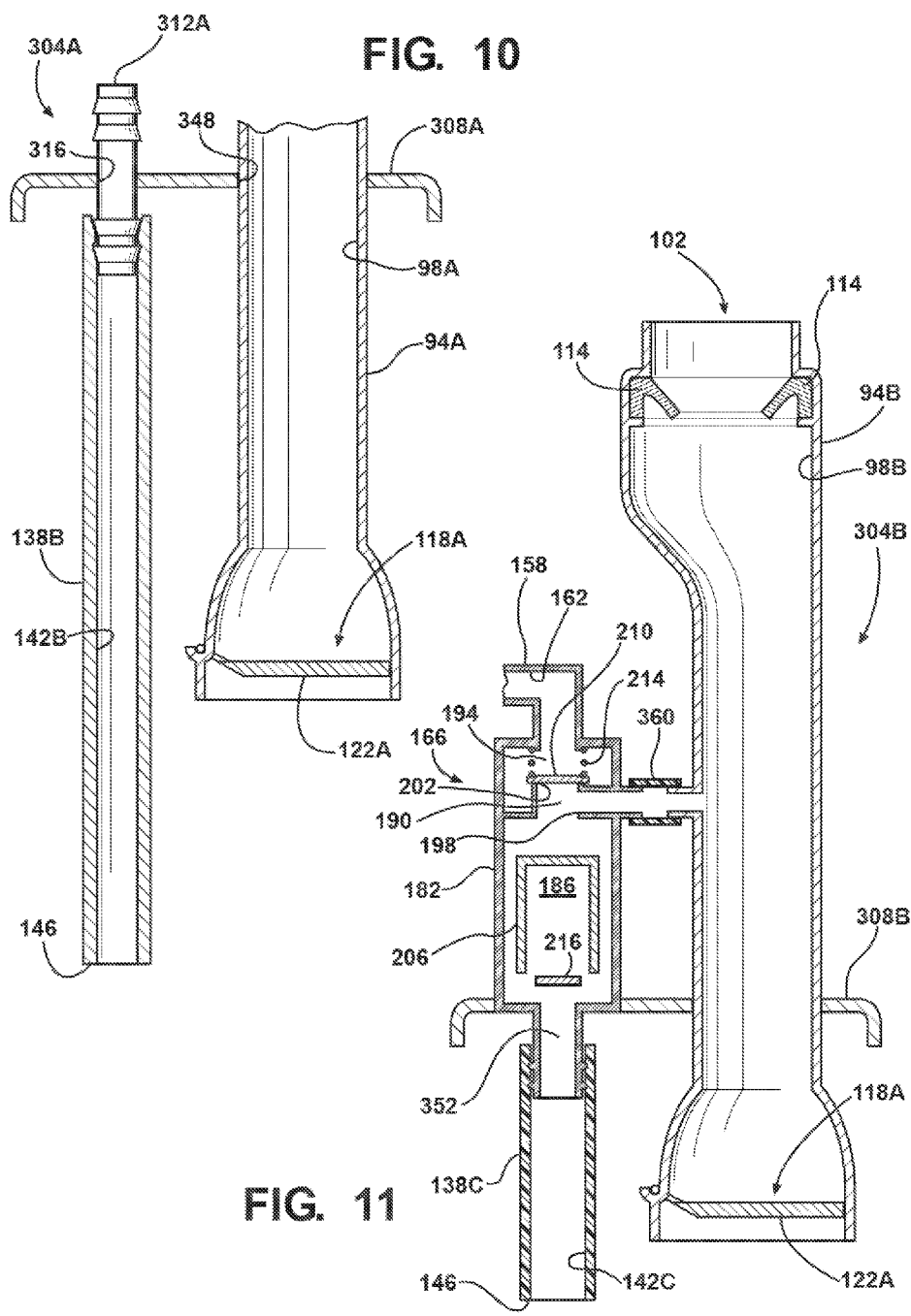

TANK ASSEMBLY

CROSS REFERENCE TO RELATED APPLICATIONS

This application claims the benefit of U.S. Provisional Patent Application No. 61/221,766, filed Jun. 30, 2009, and which is hereby incorporated by reference in its entirety.

TECHNICAL FIELD

This invention relates to tanks for storing liquid reductant, such as a urea-based solution, in a selective catalytic reduction system.

BACKGROUND OF THE INVENTION

Selective catalytic reduction (SCR) systems are sometimes employed with compression-ignition engines to reduce nitrogen oxides in the exhaust stream. SCR systems require the use of a reductant, such as anhydrous ammonia, aqueous ammonia, or urea in the exhaust stream. In some systems, diesel fuel is chemically reformulated to create ammonia. Accordingly, when the reductant is not derived from the main fuel of the engine, a separate tank is employed to store the reductant prior to injection of the reductant into the exhaust stream.

SUMMARY OF THE INVENTION

A tank assembly for storing a liquid reductant includes a tank defining a chamber, a filler tube having an opening and at least partially defining a first passageway from the opening to the chamber, and a vent system. The vent system includes a float valve and defines second and third passageways. The second passageway provides fluid communication from the chamber to the float valve. The third passageway provides fluid communication from the float valve to the first passageway.

The float valve has a float member that is selectively movable between an open position in which fluid communication between the second and third passageways is unobstructed and a closed position in which the float member obstructs fluid communication between the second and third passageways.

According to another aspect of the disclosure, an engine assembly includes an engine defining a plurality of cylinders, an exhaust system defining an exhaust passageway in selective fluid communication with the plurality of cylinders, a selective catalytic reduction system including a catalyst that is in fluid communication with the exhaust passageway, and a tank defining a chamber in selective fluid communication with the exhaust passageway. A filler tube has an opening and at least partially defines a first passageway from the opening to the chamber. A vent system has a float valve and defines second and third passageways. The second passageway provides fluid communication from the chamber to the float valve. The third passageway provides fluid communication from the float valve to the first passageway. The float valve has a float member that is selectively movable between an open position in which the fluid communication between the second and third passageways is unobstructed, and a closed position in which the float member obstructs fluid communication between the second and third passageways.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic, cross-sectional, side view of a valve assembly of the tank assembly of FIGS. 1-3 in a first configuration;

FIG. 5 is a schematic, cross-sectional, side view of the valve assembly of FIG. 4 in a second configuration;

FIG. 6 is a schematic, cross-sectional, side view of the valve assembly of FIG. 4 in a third configuration;

FIG. 7 is a schematic, cross-sectional, side view of the valve assembly of FIG. 4 in a fourth configuration;

FIG. 10 is a schematic, cross-sectional, side view of a module usable with the alternative tank of FIG. 9; and FIG. 11 is a schematic, cross-sectional, side view of another module usable with the alternative tank of FIG. 9.

DESCRIPTION OF THE PREFERRED EMBODIMENTS

Figure 1:
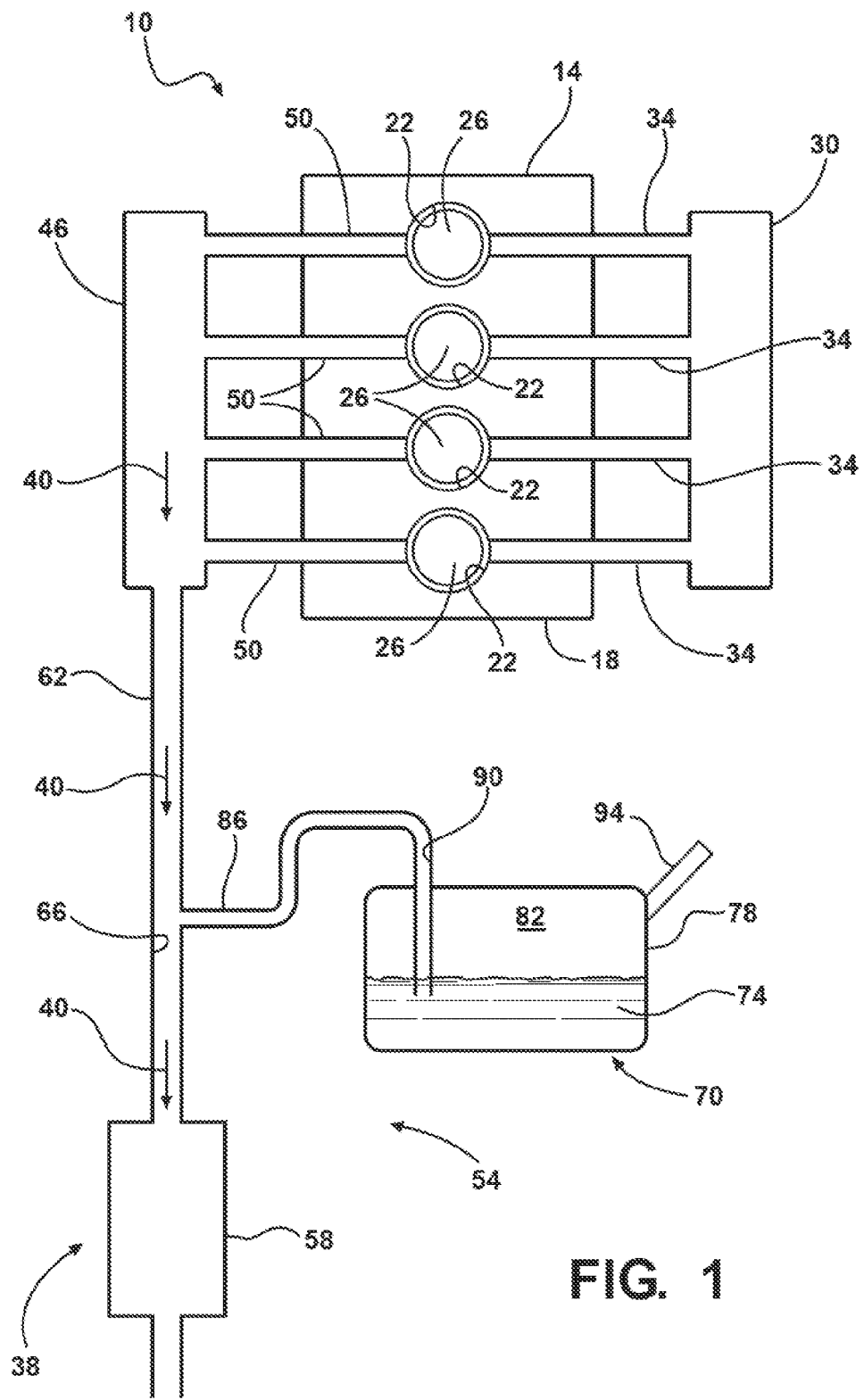
FIG. 1 is a schematic depiction of a vehicle powertrain including an engine and a selective catalytic reduction system having a tank assembly.

Referring to FIG. 1, a vehicle powertrain 10 includes a compression ignition engine 14. The engine 14 includes an engine block 18 that defines a plurality of cylinders 22. The engine 14 also includes a plurality of pistons 26; each of the pistons 26 is disposed within a respective one of the cylinders 22 for translation therein, as understood by those skilled in the art. An air intake manifold 30 distributes air to the cylinders 22 via runners 34. The engine 14 includes a plurality of intake valves (not shown). Each of the intake valves controls fluid communication between a respective one of the cylinders 22 and a respective one of the runners 34, as understood by those skilled in the art.

The engine 14 also includes an exhaust system 38 that transmits exhaust gases 40 from the cylinders 22 to the atmosphere 42. More specifically, the exhaust system 38 includes an exhaust manifold 46 that is in selective fluid communication with the cylinders 22 via runners 50 to receive exhaust gas from the cylinders 22 during the exhaust strokes of the pistons 26. The engine 14 includes a plurality of exhaust valves (not shown). Each of the exhaust valves controls fluid communication between a respective one of the cylinders 22 and a respective one of the runners 50, as understood by those skilled in the art.

The exhaust system 38 includes a selective catalytic reduction (SCR) system 54 for treating the exhaust gases 40. The SCR system 54 includes a catalyst 58 that is in fluid communication with the exhaust manifold 46 to receive exhaust gas 40 therefrom. More specifically, in the embodiment depicted, the exhaust system 38 includes a conduit 62 that defines an exhaust passageway 66 that directs the exhaust gas 40 from the exhaust manifold 46 to the catalyst 58.

The SCR system 54 also includes a tank assembly 70 for storing a liquid reductant 74. More specifically, the tank assembly 70 includes a tank 78 that defines a chamber 82 configured to store the liquid reductant 74. A conduit 86 defines a passageway 90 that provides fluid communication between the chamber 82 and the passageway 66 so that liquid reductant 74 from the tank 78 can be injected into the flow of exhaust gas 40 between the exhaust manifold 46 and the catalyst 58. For example, a pump (not shown) may draw the reductant 74 from the chamber 82 and pressurize the reductant in the passageway 90 for injection into the conduit 62 upstream of the catalyst 58. In the embodiment depicted, the reductant 74 may be ammonia or urea.

Figure 2:
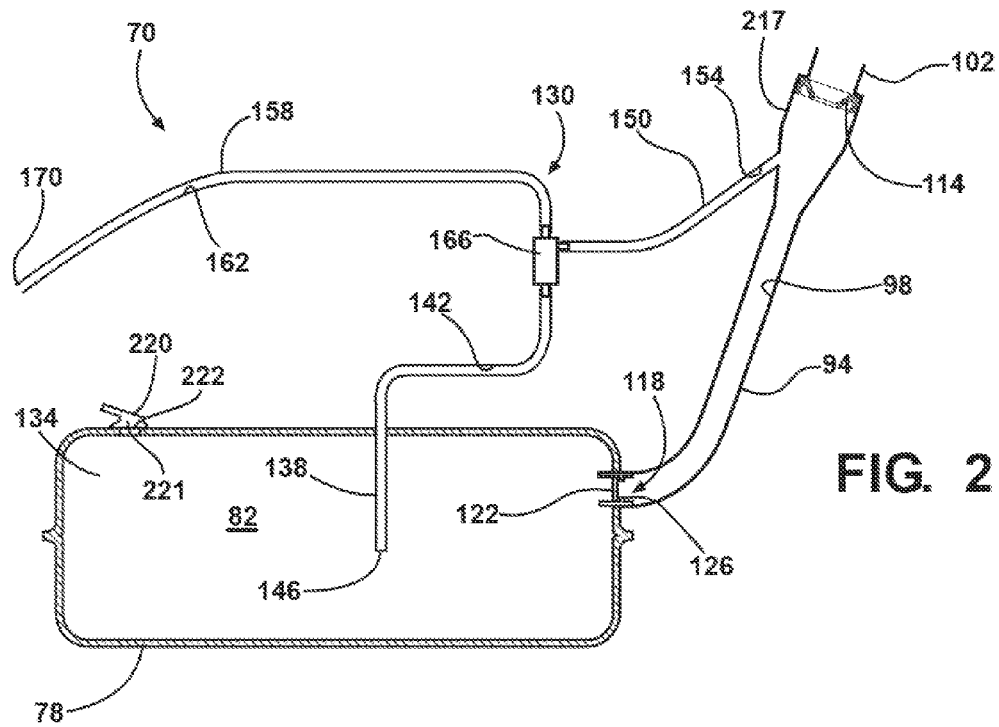
FIG. 2 is a schematic, cross-sectional, side view of the tank assembly of FIG. 1.
Figure 3:
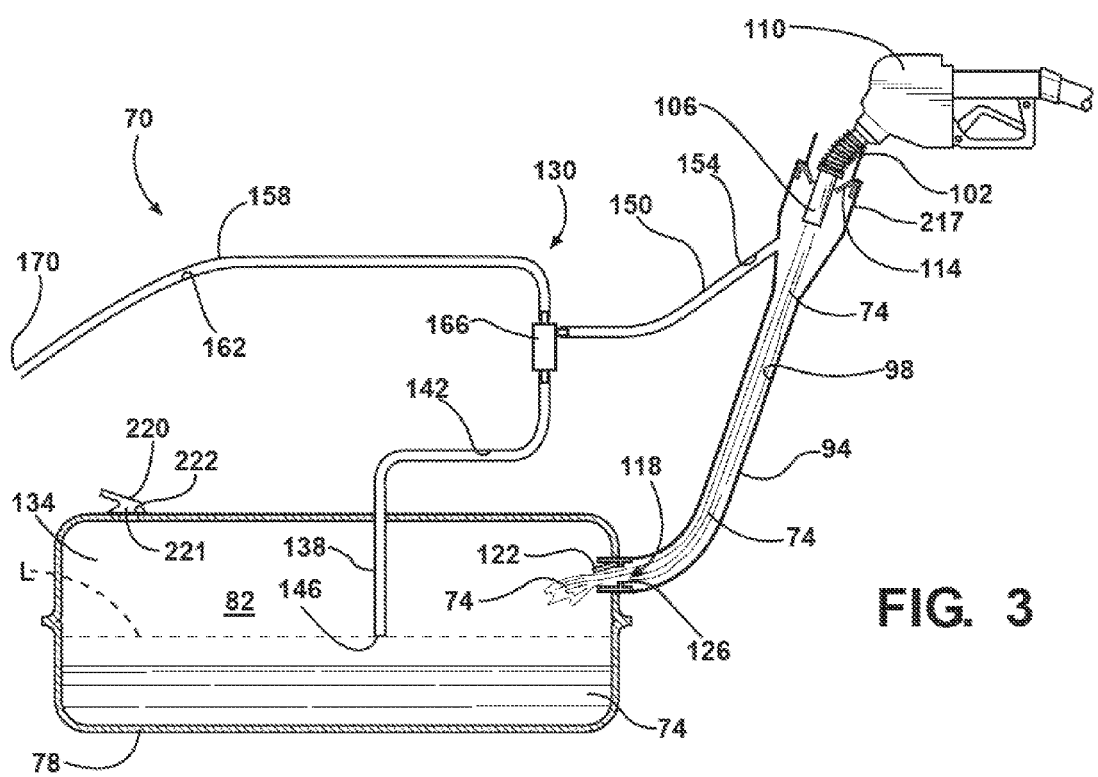
FIG. 3 is a schematic, cross-sectional, side view of the tank assembly of FIG. 1 being filled with a liquid reductant.

Referring to FIG. 2, wherein like reference numbers refer to like components from FIG. 1, the tank assembly 70 includes a filler tube 94 that is operatively connected to the tank 78. The filler tube 94 defines a first passageway 98 having an opening 102 at one end of the filler tube 94. The passageway 98 provides fluid communication between the opening 102 and the chamber 82. Referring to FIG. 3, wherein like reference numbers refer to like components from FIGS. 1 and 2, a nozzle 106 of an offboard refilling pump assembly 110 is insertable into the passageway 98 via the opening 102. The offboard refilling pump assembly 110 includes a pump (not shown) that is configured to deliver liquid reductant 74 via the nozzle 106. When the nozzle 106 is inserted through the opening 102 and the offboard refilling pump assembly 110 is delivering reductant into the passageway 98 via nozzle 106, the filler tube 94 transfers the liquid reductant 74 from the nozzle 106 to the chamber 82. A mechanical seal system 114 is disposed within the passageway 98 and is configured to sealingly engage the nozzle 106, thereby preventing fluid communication between the passageway 98 and the exterior of the filler tube 94 via the opening 102.

Referring to FIGS. 2 and 3, an inline, one-way check valve 118 is disposed between the passageway 98 and the chamber 82 of the tank 78. The check valve 118 is configured to permit fluid flow from the passageway 98 to the chamber 82, and to prevent fluid flow from the chamber 82 to the passageway 98. In the embodiment depicted, the check valve 118 includes a door 122 that is selectively rotatable between a closed position, as shown in FIG. 2, and an open position, as shown in FIG. 3. When the door 122 is in the closed position, the door 122 cooperates with a sealing surface 126 to obstruct passageway 98 at the interface between the passageway 98 and the chamber 82, thereby preventing fluid flow from the chamber 82 to the passageway 98. The check valve 118 preferably includes a spring (not shown) that biases the door 122 in the closed position. When the door 122 is in the open position, the door 122 does not obstruct the passageway 98, and thus fluid flow from the passageway 98 into the chamber 82 is permitted. Fluid pressure inside the passageway 98 overcomes the bias of the spring and causes the door 122 to move to the open position. Fluid flow from the chamber 82 into passageway 98 causes the door 122 to move to its closed position. Other check valve configurations may be employed within the scope of the claimed invention.

As understood by those skilled in the art, the chamber 82 contains gases 134 during ordinary use. The gases 134 include vapor from the reductant 74. The tank assembly 70 includes a vent system 130 that selectively permits the gases 134 in the chamber 82 to exit the chamber 82 as the gases 134 are displaced by liquid reductant 74 entering the chamber 82 from passageway 98. More specifically, as liquid reductant 74 enters the chamber 82 from passageway 98, the liquid reductant 74 displaces the gases 134, which are forced through the vent system 130.

In the embodiment depicted in FIGS. 2 and 3, the vent system 130 includes a dip tube 138 that defines a second passageway, i.e., vent passageway 142. The vent passageway 142 is characterized by an inlet 146 at one end of the tube 138. The dip tube 138 extends into the chamber 82 such that the inlet 146 is inside the chamber 82. The vent system 130 further includes a recirculation tube 150 that defines a third passageway, i.e., recirculation passageway 154, and a dump tube 158 that defines a fourth passageway, i.e., dump passageway 162.

The vent system 130 includes a valve assembly 166. Passageway 142 provides fluid communication between the inlet 146 and the valve assembly 166. Passageway 154 provides fluid communication between passageway 98 of the filler tube 94 and the valve assembly 166. Passageway 162 provides fluid communication between the valve assembly 166 and an outlet 170. Referring to FIG. 4, wherein like reference numbers refer to like components from FIGS. 1-3, the valve assembly 166 includes two valves, namely, an inline float valve 174 and an overpressure relief valve 178 that are integrated into a common valve body 182.

The valve body 182 defines a first chamber 186, a second chamber 190, and a third chamber 194. The body 182 defines a first port 198 that provides fluid communication between the first chamber 186 and the second chamber 190. The body 182 also defines a second port 202 that provides fluid communication between the second chamber 190 and the third chamber 194.

The body 182 is operatively connected to the dip tube 138 such that the passageway 142 is in fluid communication with the first chamber 186. Thus, the chamber 82 of the tank 78 is in fluid communication with the first chamber 186 of the valve body 182. The body 182 is operatively connected to the recirculation tube 150 such that the recirculation passageway 154 is in fluid communication with the second chamber 190. Thus, the second chamber 190 is in fluid communication with the filler tube 94. The body 182 is also operatively connected to the dump tube 158 such that the third chamber 194 is in fluid communication with the outlet 170.

The float valve 174 includes a float member 206 disposed within the first chamber 186. Accordingly, the float valve 174 is in fluid communication with the chamber 82 and the fill passageway 98 via passageway 142 and passageway 154, respectively. The pressure relief valve 178 includes a valve member 210 disposed within the third chamber 194. Accordingly, the pressure relief valve 178 is in fluid communication with the outlet 170 and the fill passageway 98 via passageway 162 and passageway 154, respectively. The valve assembly 166 is shown in FIG. 4 in a default condition in which the float valve 174 is open and the pressure relief valve 178 is closed.

More specifically, in the embodiment depicted, the valve assembly 166 is oriented such that gravity maintains the float member 206 in an open position in which the float member 206 does not obstruct port 198, and thus the first and second chambers 186, 190 are in fluid communication with each other. The pressure relief valve 178 includes a spring 214 that biases the valve member 210 in a closed position in which the valve member 210 obstructs port 202, and thus fluid communication between the second and third chambers 190, 194 is prevented. Other pressure relief valve configurations may be employed within the scope of the claimed invention.

The valve assembly 166 provides effective venting for a variety of different fill scenarios. Referring to FIGS. 3 and 5, in a first fill scenario, pump 110 is delivering liquid reductant 74 into chamber 82 via the passageway 98. When the amount of liquid reductant 74 in the tank is below level L, gases 134 are displaced through the inlet 146 and travel through passageway 142 to the float valve 174. Float member 206 does not exhibit buoyancy in the gases 134, and thus the float member 206 remains in its open position, as shown in FIG. 5. A diffuser plate 216 is positioned within the first chamber 186 in the flow path of gases 134 from passageway 142 to prevent pressure from the gases 134 from moving the float member 206 upward to its closed position.

Accordingly, the fill passageway 98 is in fluid communication with the chamber 82 via the inlet 146, passageway 142, chamber 186, port 198, chamber 190, and passageway 154, and gases 134 flow from the chamber 82 into the fill passageway 98.

With the float member 206 in its open position, valve member 210 is in fluid communication with the chamber 82 via port 202, chamber 190, port 198, chamber 186, passageway 142, and inlet 146. The pressure in the chamber 82 provided by pump 110 may be sufficient to overcome the bias of spring 214, and thus the valve member 210 moves to its open position in which port 202 is unobstructed. Accordingly, gases 134 also exit the chamber 82 via passageway 162 and outlet 170.

The pump 110 is configured to automatically shut off when the flow of gas 134 and vapor from the chamber 82 into the fill passageway 98 stops. Under ordinary operating conditions, when the liquid reductant 74 in the chamber 82 reaches level L, i.e., the level of the inlet 146, the liquid reductant 74 obstructs the flow of gases 134 into the vent system 130 via inlet 146. Pressure builds in the chamber 82, forcing liquid reductant 74 through the inlet 146 and into the first chamber 186. The float member 206 exhibits buoyancy in the liquid reductant 74 and rises to seal the first chamber 186 from the second chamber 190 by obstructing port 198, as shown in FIG. 6. With the float member 206 obstructing port 198, the venting of gases 134 through the dump tube 158 and the recirculation flow of gases 134 into passageway 98 via the recirculation tube stops, triggering an automatic shut-off of the pump 110 and allowing the pressure relief valve 210 to close as shown in FIG. 7.

In the event that the automatic shut-off feature of the pump 110 malfunctions and the pump 110 does not shut-off, pressure from the pump 110 may force liquid reductant 74 from the passageway 98 into the valve assembly 166 via the passageway 154 of recirculation tube 150. As shown in FIG. 6, the float member 206 obstructs port 198, thereby preventing flow of liquid reductant 74 from the passageway 154 into chamber 82. Valve member 210 is in fluid communication with the fill passageway 98 via port 202, chamber 190, and passageway 154. Accordingly, fluid pressure from a malfunctioning pump 110 acts on valve member 210 to overcome the bias of spring 214 and maintain the valve member 210 in its open position, thereby permitting excess liquid reductant from the nozzle 106 to be discharged from the outlet 170 of the dump tube 158. Thus, the pressure relief valve 178 is configured to prevent fluid communication between the first and fourth passageways 98, 162 when the pressure in the first passageway 98 is below a predetermined amount and to permit fluid communication between the first and fourth passageways 98, 162 when the pressure in the first passageway 98 exceeds the predetermined amount.

The valve assembly 166 operates in a similar manner when the tank 78 is filled from a gravity-fed tank or a pump that does not have automatic shut-off. FIG. 7 depicts the valve assembly 166 with the float member 206 in the closed position (due to liquid reductant in the chamber 186) and the valve member 210 in the closed position.

Referring again to FIGS. 2 and 3, in the fill scenarios described, the mechanical seal 114 prevents reductant vapor and liquid from exiting the opening 102 adjacent the vehicle operator. The vent system 130 is configured to provide vapor flow to the passageway 98 at the fill head 217 to prevent automatic shut-off of the nozzle 106 until the desired fill level is reached. The vent system 130 also directs excess vapor and liquid reductant away from the vehicle operator at outlet 170.

In the embodiment depicted, the tank 78 is also fillable by a container (not shown) that sealingly engages the fill head 217. In an exemplary embodiment, the fill head 217 includes threads on which the container screws for sealing engagement, such as the United States Council for Automotive Research (US CAR) fill head interface or the interface specified in ISO 22241-5. Flow from the container stalls when make-up gases cannot re-enter the container, i.e., when the liquid level in the chamber 82 reaches level L. The valve assembly 166 has the configuration shown in FIG. 4 since the container does not provide sufficient fluid pressure to open the valve 178.

The tank assembly 70 also includes a pressure/vacuum vent 220. The vent 220 is mounted to the tank 78 and cooperates with the tank 78 to define a passageway 221 from the chamber 82 to the exterior of the tank 78. The vent 220 includes a membrane 222 that entirely obstructs the passageway 221. The membrane 222 is of a material that allows vapor to pass through the membrane 222 but prohibits liquid from passing therethrough. As the membrane 222 is exposed to liquid, the liquid may slow the flow rate of the vapor through the membrane 222. Accordingly, it may be desirable to include a deflector (not shown) to prevent liquid reductant 74 from splashing onto the membrane 222. The vent 220 permits vapor to exit the chamber 82, such as when the temperature inside the tank increases with a corresponding rise in pressure. Similarly, air may enter the chamber 82 through the vent 220 as the temperature decreases, or as liquid reductant 74 is removed from the tank and injected into the exhaust system. Other pressure/vacuum vent configurations may be employed within the scope of the claimed invention.

Figure 8:
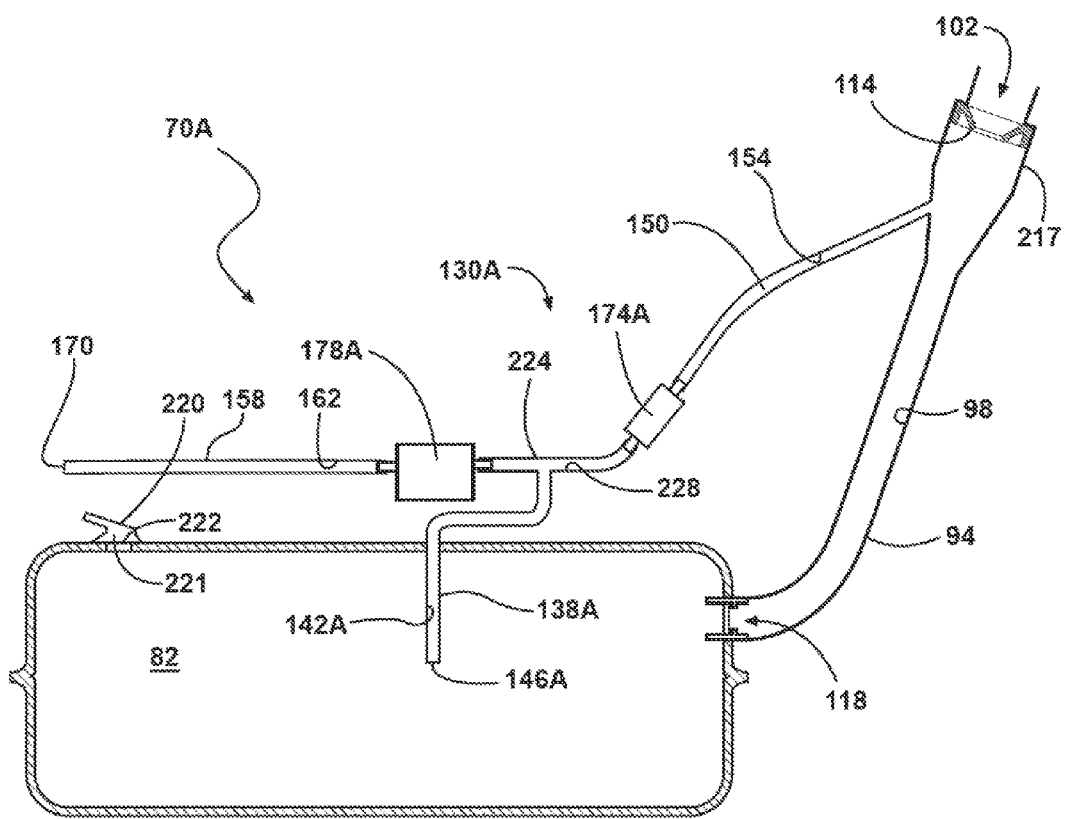
FIG. 8 is a schematic, cross-sectional, side view of an alternative tank assembly configuration in accordance with the claimed invention.

Referring to FIG. 8, wherein like reference numbers refer to like components from FIGS. 1-7, an alternative tank assembly 70A for use with the engine (shown at 14 in FIG. 1) is schematically depicted. The tank assembly 70A is substantially identical to the tank assembly shown at 70 in FIGS. 2 and 3, except for vent system 130A. In vent system 130A, dip tube 138A defines passageway 142A. Tube 224 defines passageway 228. The dip tube 138A is operatively connected to tube 224 such that passageway 228 is in fluid communication with passageway 142A. Accordingly, passageway 228 is in fluid communication with the tank chamber 82 via passageway 142A and inlet 146A.

Overpressure relief valve 178A is in fluid communication with the chamber 82 via passageway 228, passageway 142A, and inlet 146A. Valve 178A remains closed until pressure in passageway 228 exceeds a predetermined amount. Passageway 228 also provides fluid communication to inline float valve 174A, which in turn is in fluid communication with the fill passageway 98 via passageway 154 of tube 150. Float valve 174A permits the flow of gases from passageway 228 to passageway 154, but does not permit the flow of liquid reductant from passageway 228 to passageway 154.

The vent system 130A, like the vent system shown at 130 in FIGS. 2 and 3, permits gases from tank chamber 82 to enter the fill passageway 98, while directing any excess vapors or reductant overfill to outlet 170. More specifically, when the pressure in chamber 82 exceeds a predetermined amount, such as with a malfunctioning pump that does not shut off, valve 178A opens, thereby causing fluid flow from the tank chamber 82 through the outlet 70.

Figure 9:
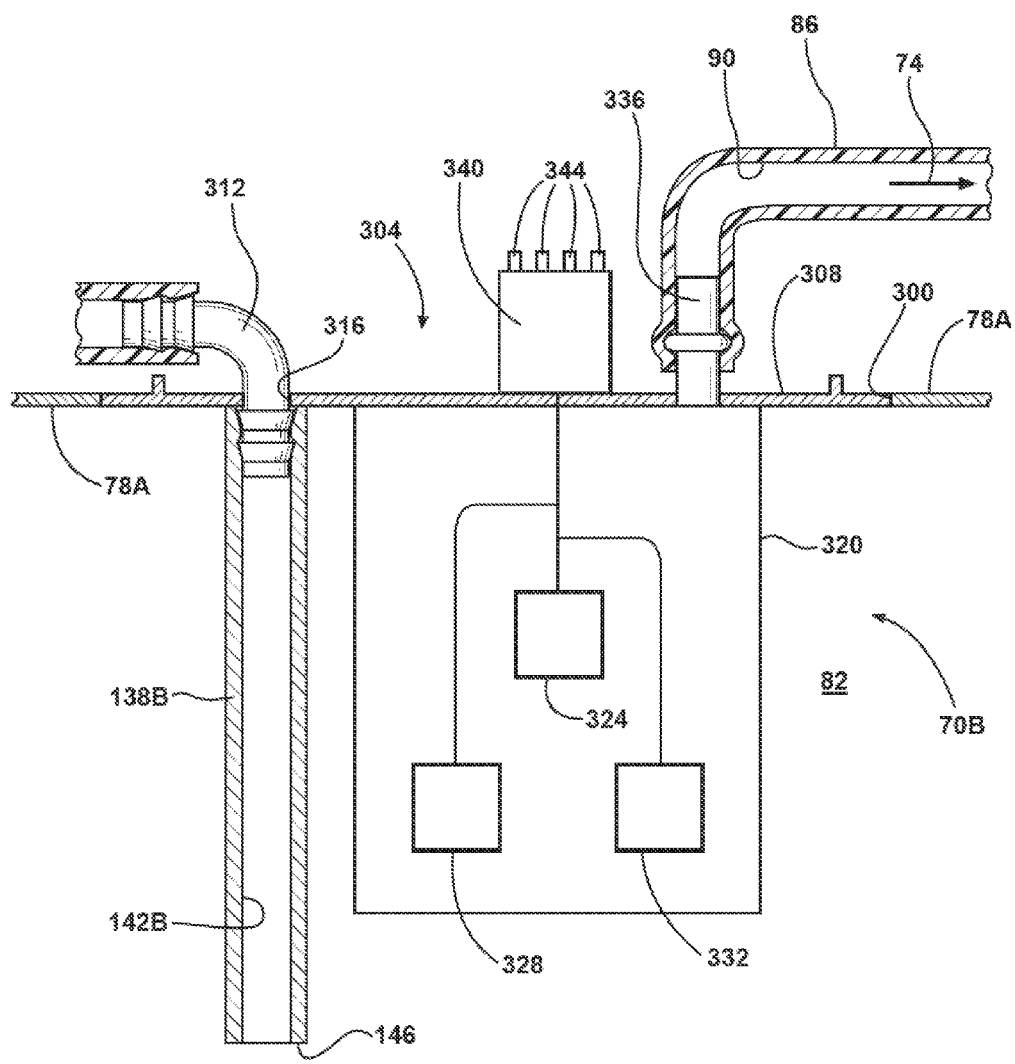
FIG. 9 is a schematic, cross-sectional, side view of an alternative tank for use with the tank assembly of FIG. 2 having modular components.

Referring to FIG. 9, wherein like reference numbers refer to like components from FIGS. 1-8, another alternative tank assembly 70B for use with the engine (shown at 14 in FIG. 1) is schematically depicted. Tank assembly 70B includes tank 78A. Tank 78A defines a circular hole 300 in its upper wall. A preassembled module 304 is mountable to the tank 78A at the circular hole 300 as shown. The module 304 includes a circular disk member 308, which is sometimes referred to as a "flange" by those skilled in the art. The disk member 308 is mounted to the tank 78A such that member 308 obstructs hole 300. In one embodiment, the flange 308 is sealed to the tank 78A with an o-ring (not shown) and held in place with a locking ring (not shown). In the same embodiment, the wall of the tank 78A is approximately twice as thick as the flange 308, and has a lip (not shown) that drops down and comes to a smaller inner diameter than the flange 308 to support the o-ring and the flange 308. The module 304 includes at least a portion of the vent system 130 mounted with respect thereto. In the embodiment depicted in FIG. 9, dip tube 138B is part of the module 304, and is mounted to member 308 such that, when the module 304 is operatively connected to the tank 78A, the dip tube 138B extends into the tank chamber 82. Dip tube 138B is operatively connected to a connector 312, which extends through a hole 316 in the member 308, and which provides fluid communication between the valve assembly (shown at 166 in FIGS. 2-7) and the passageway 142B and inlet 146 of the dip tube 138B.

The module 304 also includes various electronic componentry 320, which is mounted to member 308 such that the componentry 320 is disposed within the chamber 82. The componentry 320 in the embodiment depicted includes a fill level sensor 324 configured to monitor the level of liquid reductant in the chamber 82, a heater 328, and a pump 332. The pump 332 is configured to pump liquid reductant 74 from the chamber 82 into passageway 90 for injection into the exhaust system (shown at 38 in FIG. 1). The module 304 includes port 336. Tube 86, which defines passageway 90, is mountable to port 336 during final assembly of the tank as shown. Port 336 is mounted to the member 308 and provides fluid communication between the pump 332 and passageway 90.

An electrical connector 340 is mounted to the member 308. The electrical connector 340 includes a plurality of electrical contacts or terminals 344 that are in electrical communication with the pump 332, the heater 328, and the sensor 324 to supply electrical energy thereto, and to receive signals therefrom.

Referring to FIG. 10, wherein like reference numbers refer to like components from FIGS. 1-9, a preassembled module 304A includes disk member 308A, which defines holes 316 and 348. Connector 312A extends through hole 316, and is connected to the dip tube 138B for providing fluid communication between the passageway 142B and the valve assembly shown at 166 in FIGS. 2-7. The module 304A also includes fill tube 94A, which extends through hole 348. Fill tube 94A defines passageway 98A through which the tank chamber is fillable with liquid reductant. Fill tube 94A is substantially similar to the fill tube shown at 94 in FIGS. 2-3, and includes check valve 118A with door 122A for permitting fluid flow from the passageway 98A into the tank chamber, but restricting fluid flow from the chamber to the passageway 98A. Disk member 308A is mountable to the tank (shown at 78A in FIG. 9) such that the disk member 308A obstructs hole 300 and the inlet 146 and check valve 118A are inside the chamber 82.

Referring to FIG. 11, wherein like reference numbers refer to like components from FIGS. 1-10, preassembled module 304B includes disk member 308B, fill tube 94B, dip tube 138C, and valve assembly 166. Valve assembly 166 is mounted to the disk member 308B to be in fluid communication with the passageway 142C of dip tube 138C via a connector 352. Chamber 190 of the valve assembly 166 is in fluid communication with passageway 98B of tube 94B via tube 360. Chamber 186 is in fluid communication with the dip tube passageway 142C. Chamber 194 is in fluid communication with passageway 162 of the dump tube 158. Fill tube 94B is substantially similar to the fill tube shown at 94 in FIGS. 2-3, and includes check valve 118A with door 122A for permitting fluid flow from the passageway 98B into the tank chamber, but restricting fluid flow from the chamber to the passageway 98B. Disk member 308B is mountable to the tank (shown at 78A in FIG. 9) such that the disk member 308B obstructs hole 300 and the inlet 146 and check valve 118A are inside the chamber 82.

The preassembled modules of FIGS. 9-11 provide facilitated final assembly of the tank by reducing the quantity of parts, reducing the quantity of holes in the tank, etc. Other modules (not shown) may include various combinations of the components of modules 304, 304A, 304B. For example, in one embodiment (not shown) a module may include electronic componentry 320, a fill tube 94B, valve assembly 166, and dip tube 138A mounted to a flange that is fittable within hole 300.

While the best modes for carrying out the invention have been described in detail, those familiar with the art to which this invention relates will recognize various alternative designs and embodiments for practicing the invention within the scope of the appended claims.

The invention claimed is:

1. A tank assembly for storing a liquid reductant, the tank assembly comprising:

a tank defining a chamber;

a filler tube having an opening and at least partially defining a first passageway from the opening to the chamber;

a vent system having a float valve and defining second, third, and fourth passageways;

said second passageway providing fluid communication from the chamber to the float valve;

said third passageway providing fluid communication from the float valve to the first passageway;

said float valve having a float member that is selectively movable between an open position in which fluid communication between the second and third passageways is unobstructed, and a closed position in which the float member obstructs fluid communication between the second and third passageways;

a pressure relief valve in fluid communication with the first passageway;

wherein the pressure relief valve is configured to prevent fluid communication between the first and fourth passageways when the pressure in the first passageway is below a predetermined amount and to permit fluid communication between the first and fourth passageways when the pressure in the first passageway exceeds the predetermined amount;

wherein gravity biases the float member in the open position; and wherein the float member exhibits buoyancy in the liquid reductant such that the float member rises to the closed position in the presence of the liquid reductant.

2. The tank assembly of claim 1, wherein the first passageway and the opening are configured such that a nozzle is insertable into the first passageway via the opening; and wherein the tank assembly further comprises a seal system inside the first passageway that is configured to sealingly engage the nozzle when the nozzle is inserted into the first passageway.

3. The tank assembly of claim 2, further comprising a one-way check valve that is configured to permit fluid flow from the first passageway to the chamber and to prevent fluid flow from the chamber to the first passageway.

4. The tank assembly of claim 1, further comprising a vent that is configured to permit the flow of gaseous fluid into and out of the chamber via the vent while preventing the flow of liquid fluid into and out of the chamber via the vent.

5. The tank assembly of claim 4, wherein the vent includes a membrane that is configured to permit the flow of gaseous fluid into and out of the chamber via the vent while preventing the flow of liquid fluid into and out of the chamber via the vent.

6. The tank assembly of claim 1, wherein the tank defines a hole; and wherein the tank assembly further includes a preassembled module; said preassembled module including a flange that is mounted with respect to the tank to obstruct the hole, and at least a portion of the vent system mounted with respect to the flange.

7. The tank assembly of claim 6, wherein the preassembled module further includes the filler tube.

8. The tank assembly of claim 1, wherein the pressure relief valve and the float valve are integrated into a common valve body.

9. The tank assembly of claim 8, wherein the valve body defines a first chamber, a second chamber, a third chamber, a first port that provides fluid communication between the first chamber and the second chamber, and a second port that provides fluid communication between the second chamber and the third chamber.

10. The tank assembly of claim 9, wherein the float member obstructs the first port in the closed position; and wherein the pressure relief valve obstructs the second port when the pressure in the first passageway is below the predetermined amount.

11. The tank assembly of claim 10, wherein the third passageway is in fluid communication with the second chamber such that the first port provides fluid communication between the second passageway and the third passageway.

12. A powertrain comprising:
an engine defining a plurality of cylinders;
an exhaust system defining an exhaust passageway in selective fluid communication with the plurality of cylinders;
a selective catalytic reduction system including a catalyst that is in fluid communication with the exhaust passageway;
a tank defining a chamber for storing liquid reductant;
a conduit that provides fluid communication between the chamber and the exhaust passageway such that liquid reductant from the conduit can be injected into the exhaust passageway between the cylinders and the catalyst;
a filler tube having an opening and at least partially defining a first passageway from the opening to the chamber;
a vent system having a float valve and defining second, third, and fourth passageways;
said second passageway providing fluid communication from the chamber to the float valve;
said third passageway providing fluid communication from the float valve to the first passageway; and
said float valve having a float member that is selectively movable between an open position in which fluid communication between the second and third passageways is unobstructed and a closed position in which the float member obstructs fluid communication between the second and third passageways;
a pressure relief valve in fluid communication with the first passageway;
wherein the pressure relief valve is configured to prevent fluid communication between the first and fourth passageways when the pressure in the first passageway is below a predetermined amount, and to permit fluid communication between the first and fourth passageways when the pressure in the first passageway exceeds the predetermined amount;
wherein gravity biases the float member in the open position; and
wherein the float member exhibits buoyancy in the liquid reductant such that the float member rises to the closed position in the presence of the liquid reductant.

13. The powertrain of claim 12, wherein the first passageway and the opening are configured such that a nozzle is insertable into the first passageway via the opening; and wherein the tank assembly further comprises a seal system inside the first passageway that is configured to sealingly engage the nozzle when the nozzle is inserted into the first passageway.

14. The powertrain of claim 13, further comprising a one-way check valve that is configured to permit fluid flow from the first passageway to the chamber and to prevent fluid flow from the chamber to the first passageway.

15. The powertrain of claim 12, further comprising a membrane vent that is configured to permit the flow of gaseous fluid into and out of the chamber via the vent while preventing the flow of liquid fluid into and out of the chamber via the vent.

16. The powertrain of claim 12, wherein the tank defines a hole; and wherein the tank assembly further includes a preassembled module; said preassembled module including a flange that is mounted with respect to the tank to obstruct the hole, and at least a portion of the vent system mounted with respect to the flange.

17. The powertrain of claim 16, wherein the preassembled module further includes the filler tube.

18. A tank assembly for storing a liquid reductant, the tank assembly comprising:
a tank defining a chamber;
a filler tube having an opening and at least partially defining a first passageway from the opening to the chamber;
a vent system having a float valve and defining second, third, and fourth passageways;
said second passageway providing fluid communication from the chamber to the float valve;
said third passageway providing fluid communication from the float valve to the first passageway;
said float valve having a float member that is selectively movable between an open position in which fluid communication between the second and third passageways is unobstructed, and a closed position in which the float member obstructs fluid communication between the second and third passageways; and
a pressure relief valve in fluid communication with the chamber;

wherein the pressure relief valve is configured to prevent fluid communication between the chamber and the fourth passageway when the pressure in the chamber is below a predetermined amount, and to permit fluid communication between the chamber and the fourth passageway when the pressure in the chamber exceeds the predetermined amount;

wherein the float valve permits the flow of gases from the second passageway to the third passageway, but does not permit the flow of liquid reductant from the second passageway to the third passageway.

\* \* \* \* \*